Figure 7:
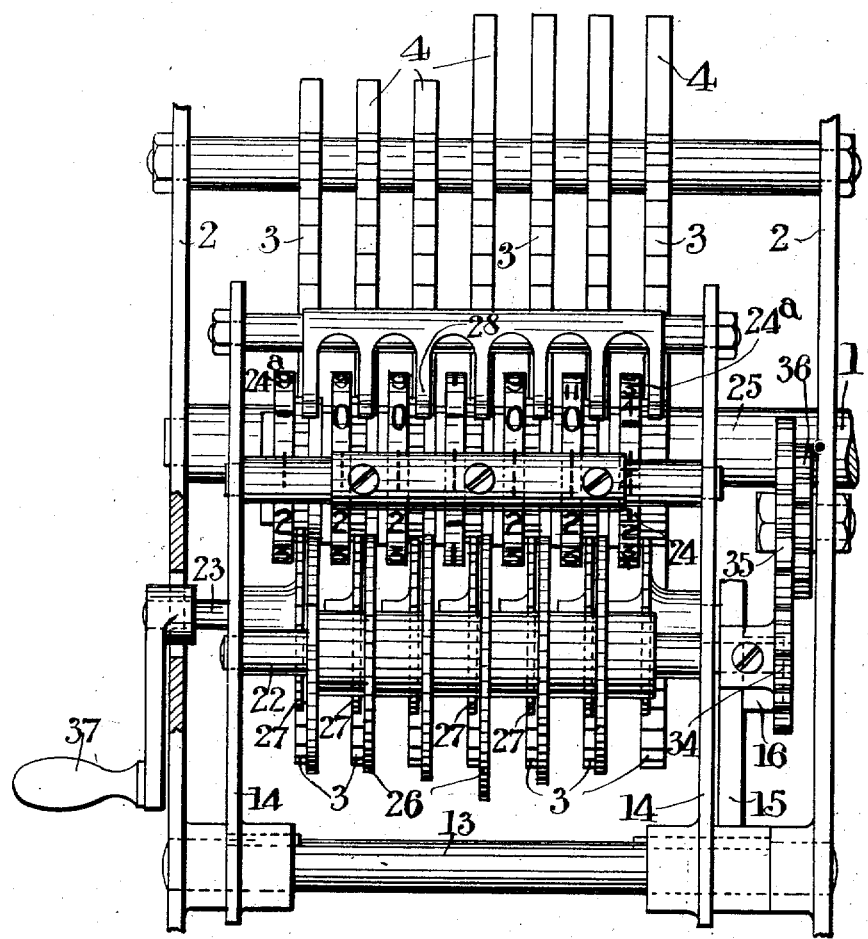

J. M. TOURTEL.
ADDING MACHINE.
APPLICATION FILED JULY 1, 1909.
969,223.
Patented Sept. 6, 1910.
6 SHEETS—SHEET 1.
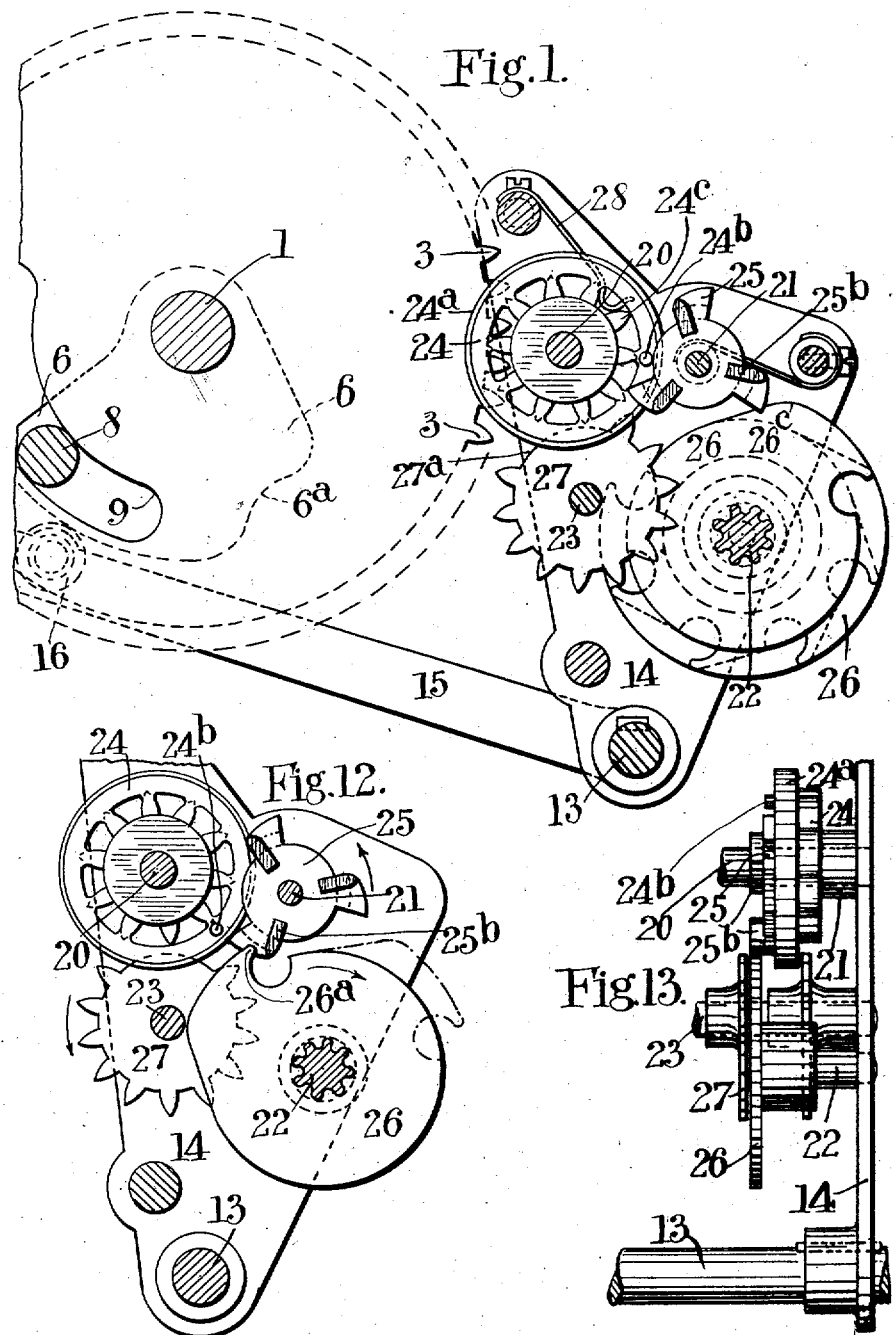
INVENTOR,
JOHN MESNY TOURTEL,

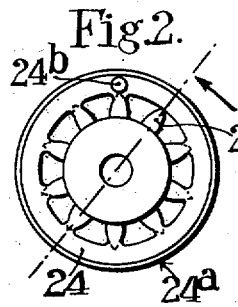
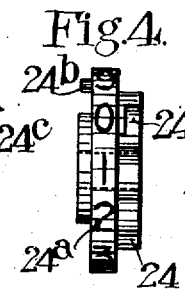
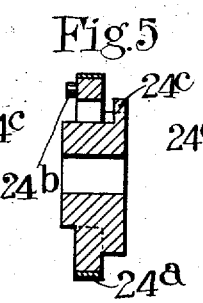
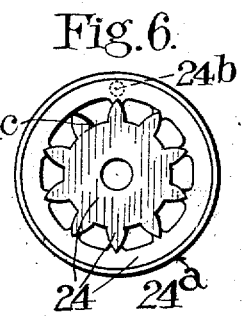
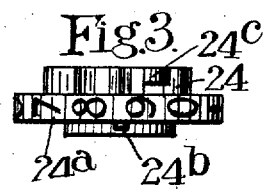
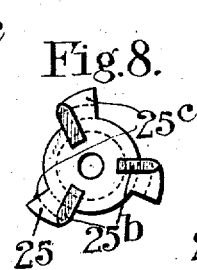
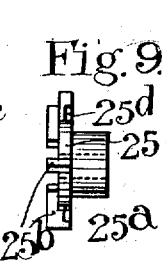
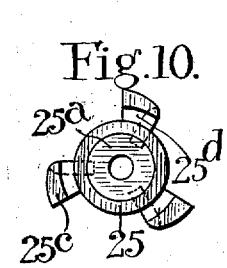
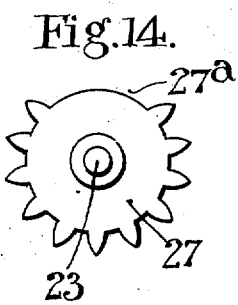
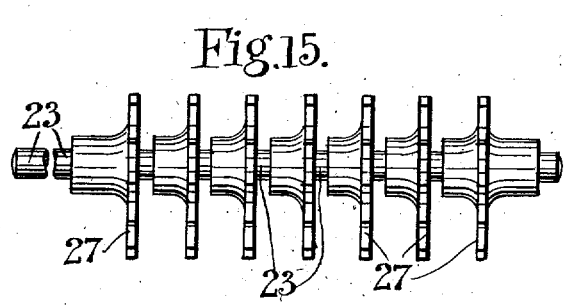
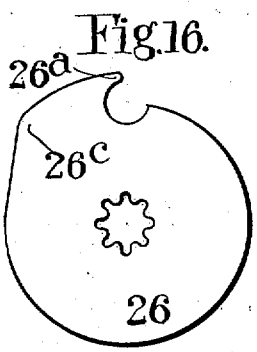
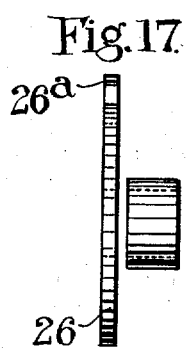
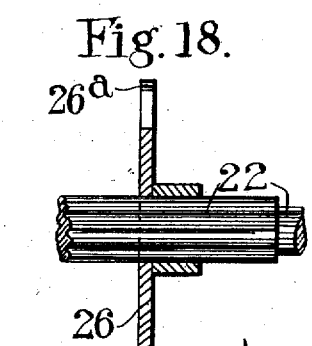

J. M. TOURTEL.
ADDING MACHINE.
APPLICATION FILED JULY 1, 1909.

969,223.

Patented Sept. 6, 1910.
6 SHEETS—SHEET 3.

WITNESSES;
H. H. Berrigan
Alfred R. Anderson

INVENTOR,
JOHN MESNY TOURTEL,
by
ATTORNEY.

J. M. TOURTEL.
ADDING MACHINE.
APPLICATION FILED JULY 1, 1909.

969,223.

Patented Sept. 6, 1910.
6 SHEETS—SHEET 4.

WITNESSES:
H. H. Berrigan
Alfred R. Anderson

INVENTOR,
JOHN MESNY TOURTEL,
by
H. Van Dedenwal
ATTORNEY.

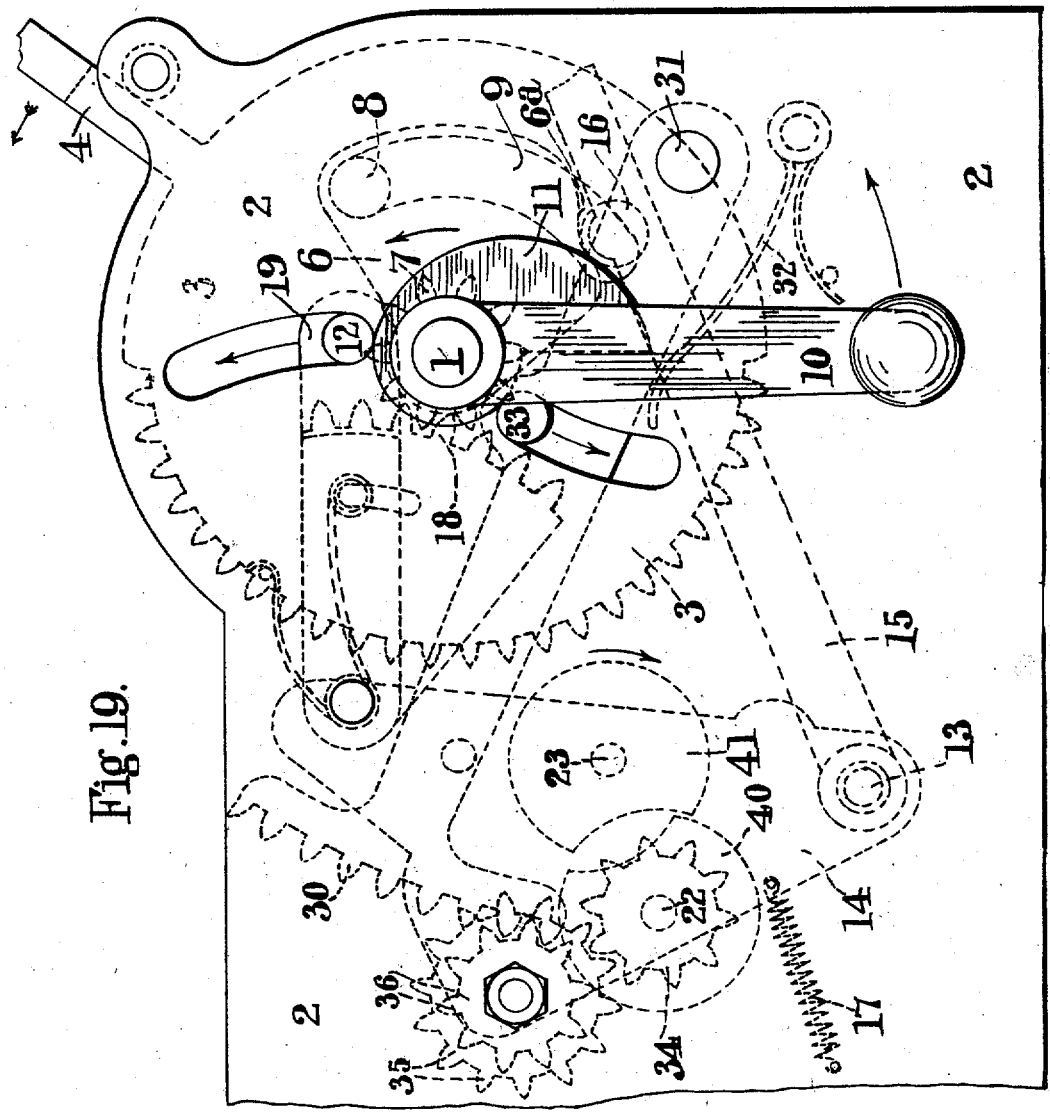

J. M. TOURTEL.
ADDING MACHINE.
APPLICATION FILED JULY 1, 1909.
969,223.
Patented Sept. 6, 1910.
6 SHEETS—SHEET 6.
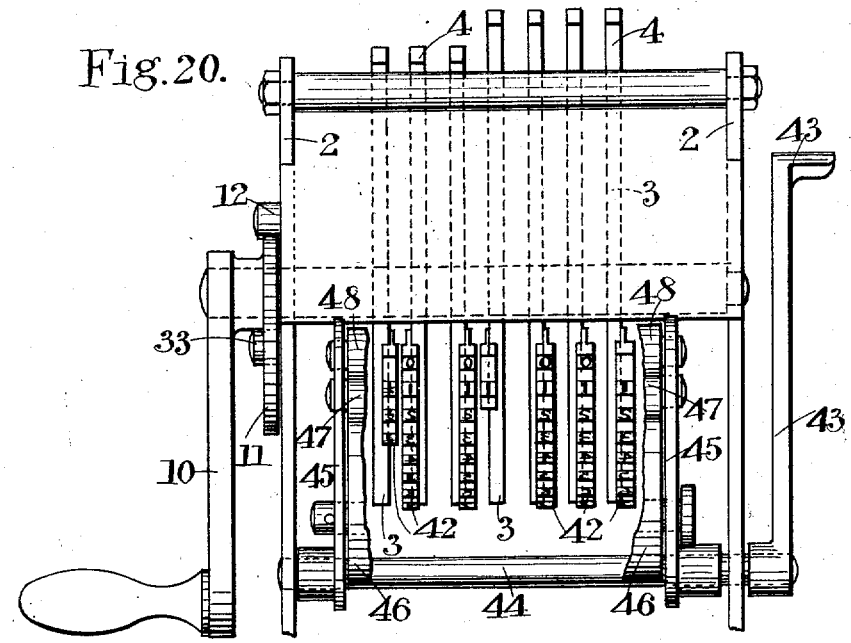
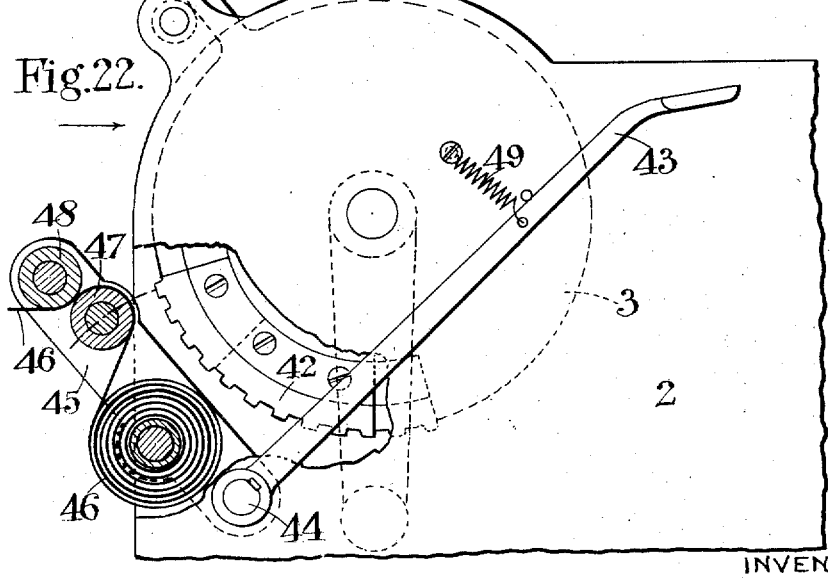
WITNESSES;
N. H. Berrigan
Alfred R. Anderson
INVENTOR,
JOHN MESNY TOURTEL,
by H. Van Dedemvael
Attorney.

UNITED STATES PATENT OFFICE.

JOHN MESNY TOURTEL, OF LONDON, ENGLAND.

ADDING-MACHINE.

969,223.  Specification of Letters Patent.  Patented Sept. 6, 1910.

Application filed July 1, 1909. Serial No. 505,427.

*To all whom it may concern:*

Be it known that I, JOHN MESNY TOURTEL, a citizen of the United Kingdom of Great Britain and Ireland, and resident of 57 Chiswell street, London, England, have invented a certain new and useful Improved Adding-Machine, of which the following is a specification, such as will enable others skilled in the art to which it appertains to make and use the same.

This invention relates to adding machines of the kind in which toothed sectors are set by (or limited in their travel by the setting of) levers or keys operated by hand, and more particularly relates to that class of such adding machines in which the totalizing counter is normally kept out of gear with the racks and is brought into engagement therewith by movement of the frame carrying it after the racks or their keys or levers have been set.

One of the objects of my invention is to construct a simple and inexpensive adding machine with the mechanism arranged in small lateral compass. This arrangement in a small lateral compass enables me to attach directly to the toothed sectors annular segments bearing figures which can be used for printing items or totals on a comparatively narrow strip of paper, thus dispensing with the cranked or off set segments usually employed for this purpose.

Another object of my invention is to enable the "carry" or "transfer" to be effected by rotatable transfer cams of special construction which are set by pins or projections upon the counter wheels, operating when the zero position is passed, which cams are subsequently acted upon successively when set and are partially rotated by transfer wipers of special construction arranged in echelon in novel manner upon a rotatable spindle, the arrangement being that belonging to the type of mechanism in which the transfer cams are first partially rotated by a transfer pin the movement being subsequently completed by staggered wipers to effect the transfer. This partial rotation brings another portion of the transfer cam into position for setting so that repeated "setting" and "wiping" will eventually cause the complete rotation of each transfer cam, a particularly novel feature being that this "carry" or "transfer" mechanism is entirely mounted in the movable frame or cradle bearing the counter and the wipers are actuated through suitable gearing by a segmental rack pivoted to the case. I employ an operating handle pivoted upon the same shaft as that which bears the toothed sectors which handle upon being turned through one complete revolution returns the toothed sectors and effects the "carry" by means of a cam or cams preferably fixed to the said operating handle.

I will now describe my invention with reference to the accompanying drawings in which a machine is shown in detail.

Figure 11:
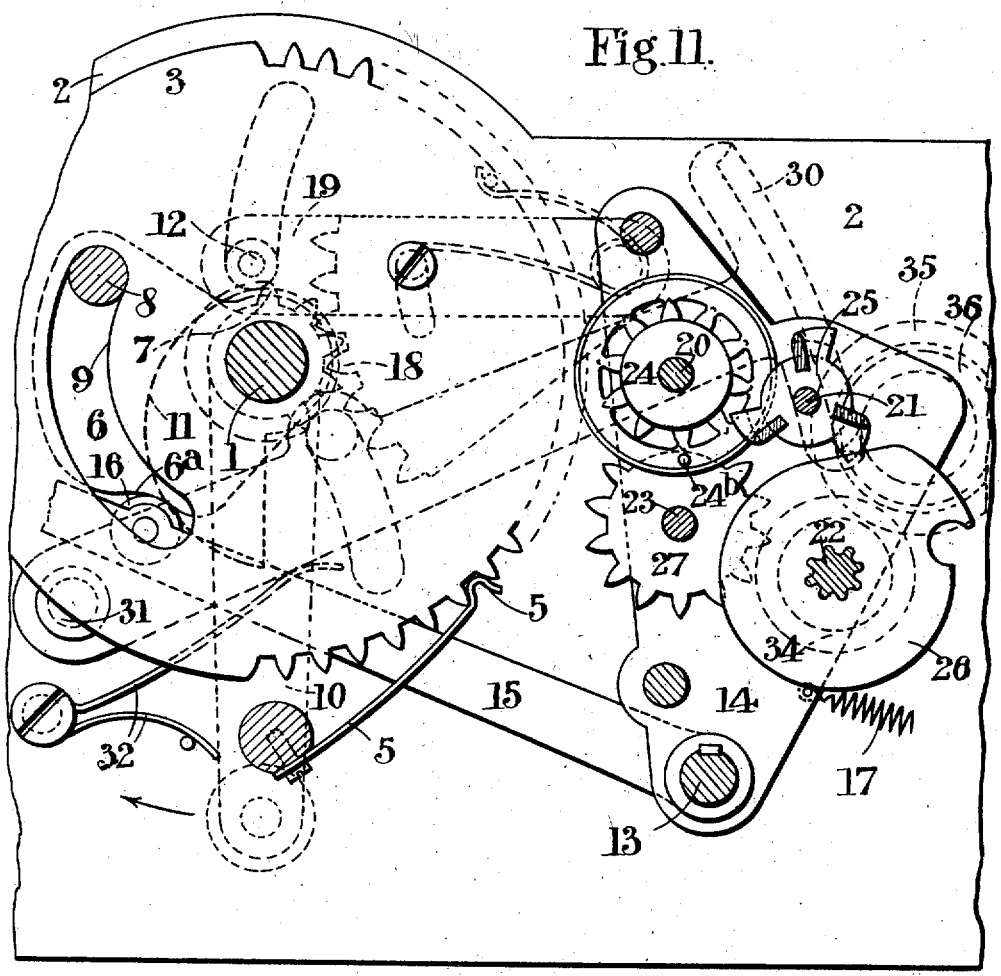

Figure 1. is a view showing one of the toothed sectors in dotted line and its relation to the counter mechanism. Figs. 2. to 6, 8 to 10, 14 to 15, and 16 to 18 inclusive show details of the counter mechanism. Fig. 7. is a front view of the counter mechanism and of the toothed sectors behind same. Figs. 11, 12 and 13 are further views of parts of the counter mechanism. Fig. 19 is an external view of the frame of the machine showing the mechanism in dotted lines and the operating handle in full line. Fig. 20. is a rear view of the machine and shows more particularly the annular segments bearing the printing type on the toothed sectors. Fig. 21. is an illustration of the spacing of the printing when applied to pounds, shillings and pence. Fig. 22. is a side view of the machine and shows details of a printing device and the annular printing segments.

A main shaft 1 is supported in a frame 2 and carries the toothed sectors 3, of which the number may vary, said toothed sector in the example shown having projections 4 for setting, and being furnished with retaining springs 5. The same shaft also has fixed to it a shaped plate 6 provided with a pinion 7 and a rod 8 which passes through corresponding slots 9 in each of the racks. Upon the outer end of the said shaft the operating handle 10 is loosely mounted, the boss or other such part of the said handle carrying a snail 11 normally in the position shown in Fig. 19. The toothed sectors 3 are preferably mounted on a sleeve on the shaft 1.

Fixed on a shaft 13 is a cradle 14 carrying the counter mechanism. A lever 15, also fixed to the shaft 13, is provided at its free end with a roller 16, which is normally kept by means of spring 17 against a recess 6ᵃ in the operating edge of the plate 6.

A spring controlled and pivoted rack 18 meshes with the pinion 7 and carries a projection 19 on which is a roller or pin 12 projecting sidewise through the frame 2. The spring pressure on rack 18 retains the plate 6, through the pinion 7, in raised position as shown in Fig. 19. Upon the handle 10 being turned the snail 11, engaging the roller 12, lifts the rack 18, and through the pinion 7 turns the plate 6 as shown in Fig. 1. This movement depresses the lever 15 through its roller 16 and brings up the cradle 14 in opposition to spring 17, and subsequently causes pin 8 to put back any toothed sectors which have been set forward.

The cradle 14 is shown carrying four spindles, 20, 21, 22 and 23, on which are mounted respectively the counting pinions or index 24, the transfer cams 25, the transfer wipers 26, and the zeroizing wheels 27.

The counting apparatus is shown in detail in Figs. 2, 3, 4, 5 and 6, and each piece consists of pinion 24, figure disk 24$^a$ and transfer pin 24$^b$ preferably (but not necessarily) made integral with each other, as by casting. One of the teeth 24$^c$ of pinion 24 is cut away as shown in Figs. 4 and 5, for the purpose of zeroizing, as hereinafter described. The figure disk 24$^a$ is shown with apertures in it, for the purpose of facilitating the casting of clean edges to the teeth of the pinion 24, and to enable the thin tooth 24$^c$ to be easily formed.

The pinions 24 are held by retaining springs 28, shown in Fig. 7, in the form of a comb. The transfer cams 25, as shown in detail in Figs. 8, 9 and 10, are mounted on bosses 25$^a$, and are of three-leaf form, each leaf having a side projecting tooth 25$^b$; and a groove 25$^d$ is formed in the blades of the transfer cams, to permit the passage of the pin 24$^b$, as hereinafter described. These cams 25 are so arranged that when the figure disk 24$^a$ passes to zero, the pin 24$^b$ engages with edge 25$^c$ of one of the leaves of the cam 25, and moves it from the position shown in Fig. 11 to that shown in Fig. 12. In this latter position the cam 25 is quite free from engagement with the index. Upon a transfer wiper 26 being rotated in direction of the arrow, Fig. 12, its nose 26$^a$ is brought against the tooth 25$^b$ and turns the cam, completing a third of a revolution, and brings it to a position similar to that shown in Fig. 11, in so doing, the next following tooth 25$^b$ is brought into engagement and turns the adjoining pinion the distance of one tooth, thus effecting the transfer, as from units to ten.

The transfer wipers, as shown in detail in Figs. 16, 17 and 18 are mounted in echelon on a drawn pinion shaft, the wipers having holes corresponding to the pinion, and being placed thereon consecutively one tooth in advance, as shown in Fig. 1. Upon the shaft 22 being rotated as hereinafter described, the wipers are necessarily brought into the path of their respective transfers, and actuate only those which have been set by the index or those which have been set by the operation of the next transfer wiper. It will be observed that each transfer wiper is provided with a nose 26$^a$, in front of which an aperture 26$^d$ is formed, terminating in a circular edge, which edge is normally presented to the teeth 25$^b$ of a transfer cam and prevents the said teeth from being turned beyond the distance requisite for setting, as shown in Fig. 12. This edge leads to a segmental extension 26$^e$ terminating at the nose; said extension being for the purpose of preventing an over-run of the transfer cam during rotation. The tooth engaged by the nose has room in the aperture for passing clear of the circular edge referred to, as already described. The shaft 22 is rotated through toothed wheels 34, 35 and 36, by means of a segmental rack 30 pivoted at 31 and kept in raised position by means of a spring 32. This rack 30 has a roller 33 projecting through a slot in the case 2 and in the path of the snail by which it is depressed. The zeroizer on shaft 23, shown in detail in Figs. 14 and 15 consists of a series of partially-toothed wheels similarly placed on the shaft. In their normal position, the gaps 27$^a$ of the wheels 27 are presented to the pinion of the index, but when the spindle 23 is rotated by the separate handle 37 (Fig. 7,) they engage the wheels of the index and rotate these wheels until each zeroizing wheel reaches the space behind the reduced tooth 24$^c$, when the zeroizing wheel no longer engages with the index wheel, but can freely pass around into its normal position, thus leaving all the wheels of the index at zero. This action of the zeroizer turning in one direction sets some or all of the transfer cams, and it is necessary that these should be returned to their normal position, in order to complete the zeroizing operation. For this purpose, I place upon the shafts 22 and 23 two interlocking segments 40 and 41, of known form as shown in Fig. 19, so positioned that the segment 40 is normally in the path of segment 41, but, upon depressing (by any convenient means) the rack 30 to its full extent, the segment 40 is brought into position for the segment 41 to freely pass it. Upon operating the zeroizing handle it will now lock the segment 40 until the rotation is completed, and upon releasing the rack 30 it will rise, under the influence of its spring, and turning the transfer wipers in the reverse direction will bring successively the inclined portions 26$^b$ against the teeth 25$^b$ of the transfer cams 25, and will return those cams which have been previously set by the zeroizer to normal position.

In Figs. 20 to 22 the toothed sectors 3 carry segmental type plates 42, shown of T section on their rear edges, designed to print on a roll of paper 46 carried in a frame 45 on spindle 44, which is operated by lever handle 43 furnished with return spring 49. The frame 45 is shown with tension rollers 47 and 48. It will be observed that the type segments are arranged directly on either the adjacent or the distant sides of the toothed sectors in such a manner that the printing from the type can be made in lines either equidistant or at different distances apart so as to produce columns of varying width to distinguish between the figures of various values; as in the example shown, the three type segments of the pound figures are at regular spaces apart, while those of the shillings and those of the pence and farthings columns are arranged closer together, and thus extra space between the pounds and shillings; and the shillings and pence, is provided.

The method of operation is as follows:—

The toothed sectors are moved into the positions corresponding to the numerals to be added (the top of the case may be marked with numerals); the handle 10 is then turned through a complete revolution, during which the snail 11 first begins to move the rack 18, and immediately brings the wheels of the index into mesh with the toothed sectors as described. The further movement causes the pin 8 of plate 6 to traverse the slots in the toothed sectors and bring back those toothed sectors which have been set forward, and in so doing actuates the corresponding wheels of the index. The snail 11 releases the rack 18, which returns under the influence of its spring, and by means of pinion 7 and plate 6, allows the roller 16 to engage in recess 6ª, thereby permitting the cradle 14 to be brought back by spring 17, thus disconnecting the index from the toothed sectors. The continued movement of the snail will now, through the roller 33, depress the rack 30 and rotate the transfer apparatus as hereinbefore described. Upon setting the toothed sectors for a second item and operating as above described, this item will be added to that already transferred to the index.

I may employ the apparatus described in connection with toothed sectors set by keys or the like instead of being directly operated by hand. Sufficient idle movement of the snail 11 may be provided between the points of release of the rack 30 and commencement of the operation of the rack 18 to allow of the printing of items to be effected before the racks have begun to move back, any known or convenient printing device being employed. As an alternative I may retain the counter in engagement with the toothed sectors during the operation of the transfer mechanism, and allow the toothed sectors affected by the "carry" to be set back one tooth beyond their normal positions, subsequently returning them to their normal positions in any convenient manner. In this case I would dispense with the recessed plate 6 and furnish the operating handle with a cam of suitable shape so as to operate the lever 15 and retain during the time that the toothed sectors are being returned to their normal positions and during the operation of the transfer mechanism the slots through which the operating fingers pass being prolonged to allow the toothed sectors to be set back one tooth beyond the normal, any suitable means. such as a bar actuated by the operating handle toward the end of its revolution to return such sectors as have been overset to their normal positions. I may also prevent the rotation of the operating handle beyond one complete revolution by means of any convenient form of catch or the like, capable of being released by a lever or equivalent, which catch may be re-set during the rotation of the operating handle.

The machine can be applied either to decimal adding or it can be made for adding in any numerical system where conversion is necessary. For instance, in constructing it to add pounds, shillings, pence and farthings, the wheels 24ᶜ may have twelve teeth for both pence and farthings; and there may be three pins or projections such as 24ᵇ on the farthing wheel 24, and the tens of shillings wheel may have five pins or projections such as 24ᵇ. In a similar way the machine can be adapted for adding tons, cwts., qrs. and lbs. or any other desired values. In such cases the only parts of the machine which need be varied are the toothed sectors and counter wheels, all the other parts remaining the same. In order to print subtotals or grand totals the amount shown on the counter may be set by means of the toothed sectors. This brings the correct figures upon the printing segments opposite the printing strip which may be made, by any convenient means, to print the total thus set up. The toothed sectors are then set back by any convenient means while the counter is out of gear with them and the counter is thus unaffected.

The purposes of the groove 25ᵈ formed in the blades of the transfer cams previously mentioned are as follows:—I will presume that I am dealing with the units and tens of a decimal adding machine. If the counter bears the figures 99 and I then add 99 each wheel will be turned through 9 teeth and will be brought to 88, the transfer cam of each being set at the same time because each wheel has passed the zero position. Upon operating the transfer wipers the transfer cams will be successively affected as hereinbefore described. The units transfer cam will turn the tens wheel and set it to 9. The tens transfer cam will then turn the hundreds wheel to 1. The projection 24$^b$ on the tens wheel, however, is in the path of the leaf of the transfer cam but the groove 25$^d$ permits the leaf of the transfer cam to pass over the pin 24$^b$. The edge 25$^c$ (Fig. 8.) of the leaf of the transfer cam is, in its normal position, Fig. 1. at some distance from the pin 24$^b$ when the latter is in the zero position, as shown in Fig. 1. and as the subsequent movement of the pin 24$^b$ is in a direction away from the axis of the transfer cam the pin will have moved sufficiently away from the said axis before encountering the edge of the transfer cam to avoid entering it the groove 25$^d$ and such movement of the pin 24$^b$ will strike the outer extremity of the leaf and will set the transfer cam as before described.

What I claim is:

1. In an adding machine, a plurality of toothed sectors, a totalizing counter normally out of contact with said sectors, means for bringing said counter into engagement with said sectors, sector racks, one for returning to their normal positions those of said toothed sectors previously set, and the other sector rack arranged to effect a "carry" of "transfer," suitable cam for operating said sector racks, and a shaft for operating said cam and capable of movement through a complete rotation.

2. In an adding machine, a plurality of toothed sectors, a cradle, a counting mechanism carried by said cradle and normally out of contact with said sectors, and a handle and connections whereby said cradle is moved to bring said counting mechanism alternately into and out of contact with the toothed sectors, the said counting mechanism comprising a series of counter wheels, rotatable transfer devices adapted to be engaged by said counter wheels, and a series of rotatable wipers adapted to bring the transfer devices to their normal positions.

3. In an adding machine, a plurality of toothed sectors, a totalizing counter normally out of contact with said sectors, and means for bringing said counter into engagement with said sectors, in combination with transfer devices having grooves, with means for operating said devices and provided with pins for passing through the grooves aforesaid.

4. In an adding machine, a plurality of toothed sectors, a totalizing counter having wheels normally out of contact with said sectors, transfer means for engaging the wheels aforesaid, a multigrooved pinion, transfer wipers of cam shape having projecting noses and serrated openings by which they are set in echelon upon the pinion, said noses engaging the transfer devices aforesaid.

5. In an adding machine, a counter mechanism comprising a transfer wiper cam having a projecting nose and an aperture in front thereof, said cam also having a circular edge which is normally nearer the center of the transfer device than the extremity of the teeth thereon, and said edge extending partly around the cam and leading to a segmental extension terminating at the nose aforesaid.

6. In an adding machine, a plurality of setting racks each having a projection for setting by hand, a counter mechanism comprising a plurality of indices, each separate index comprising a figure disk, pinions for engaging with the setting racks, a carry device, projections on said indices for setting said carry device, a zeroizing spindle provided with a series of broken pinions capable of engaging the pinions of the counter mechanism when said zeroizing spindle is rotated for the purpose of bringing all the indices to the zero position.

7. In an adding machine, a plurality of toothed sectors, a totalizing counter normally out of engagement with said sectors, a frame, four spindles, a counter mechanism carried by said frame, and means for operating the frame to bring said counter mechanism alternately into and out of contact with the toothed sectors, the counter mechanism comprising indices mounted on one of said spindles, and having transfer projections and pins, tooth transfer cams of multiple cam-like form mounted on a second of said spindles, zeroizing wheels mounted on a third of said spindles, and cam-shaped plates mounted on the fourth of said spindles and having projecting noses for engaging the transfer ca.

In witness whereof I have hereunto set my hand in presence of two witnesses.

JOHN MESNY TOURTEL.

Witnesses:
W. J. NORWOOD,
JOSEPH LAKE.